United States Patent [19]

Alvite'

[11] Patent Number: 4,694,231

[45] Date of Patent: Sep. 15, 1987

[54] ROBOTIC SKIN

[75] Inventor: Joseph G. Alvite', Wyoming, Minn.

[73] Assignee: Mecanotron Corporation, Minneapolis, Minn.

[21] Appl. No.: 853,637

[22] Filed: Apr. 18, 1986

[51] Int. Cl.$^4$ ............... G01L 1/16; G05D 15/00; H01C 10/10

[52] U.S. Cl. ............... 318/568; 318/646; 73/862.04; 901/33; 338/47; 338/99; 338/114

[58] Field of Search ............... 318/568, 646; 73/862.04, 862.68, 432 T; 310/338, 800; 901/33, 46; 338/47, 99, 101, 114, 100, 112, 104; 364/513, 557, 558

[56] References Cited

U.S. PATENT DOCUMENTS

| | | | |
|---|---|---|---|
| 4,314,228 | 2/1982 | Eventoff | 338/99 |
| 4,481,815 | 11/1984 | Overton | 338/114 |
| 4,492,949 | 1/1985 | Peterson | 338/114 |
| 4,503,416 | 3/1986 | Kim | 338/99 |
| 4,539,554 | 9/1985 | Jarvis | 73/862.04 |
| 4,555,953 | 12/1985 | Dario | 73/862.04 |

Primary Examiner—William M. Shoop, Jr.
Assistant Examiner—Patrick C. Keane
Attorney, Agent, or Firm—Orrin M. Haugen; Thomas J. Nikolai; Frederick W. Niebuhr

[57] ABSTRACT

A multi-layered tactile sensing skin is provided for a robotic arm or the like. The skin includes adjacent layers of electrically insulative film having opposed contiguous surfaces. An electrically conductive carbon based compound is applied uniformly to one of the surfaces, while the other surface is selectively coated with silver oxide to form a series of pairs of first and second electrically conductive regions separated from one another by a dielectric gap. The carbon based conductor bridges the gap betwen the conductive regions in each pair, permitting flow of electrical current between the regions. The current flow increases with an increase in pressure over the interface between the layers of film, and the amperage increase can be utilized to trigger a signal to the robot power supply, to decelerate, stop or reverse arm movement.

8 Claims, 4 Drawing Figures

ROBOTIC SKIN

BACKGROUND OF THE INVENTION

In recent years, use of automatic manufacturing processes has become increasingly prominent in industry. The need for robots to perform an ever-widening variety of tasks has created a demand for more sophisticated robotic equipment. For example, one desired feature for certain robotic applications is that the robot have tactile sensing capabilities. With such capabilities, a robot can hold an object under a controlled gripping pressure, and in some cases identify the object being held.

One example of tactile sensing is shown in U.S. Pat. No. 4,555,954 to Kim granted Dec. 3, 1985. Kim teaches a circuit board 102 with a plurality of spaced apart conductive foils 104, each of which is connected to a decoder 106 for selectively applying voltages through individual foils. An anisotropically conductive pad 107 has electrically conductive strips 108 overlying foils 104, but separated from the foils by up-raised insulative portions 116. Each of strips 108 is connected to a multiplexer 115. Conductive strips 108 are deformed responsive to application of force, so that the location and magnitude of the applied force can be determined from the voltage at the multiplexer output.

U.S. Pat. No. 4,555,953 to Dario et al granted Dec. 3, 1985 shows a sensor having a superficial layer 1, a deep sensing layer 2 and an intermediate layer 3 between layers 1 and 2. The deep sensing layer includes an upper layer of a ferroelectric polymer, and a series of metal electrodes 6 beneath film 4. The superficial layer includes a plurality of metal electrodes 20 sandwiched between two layers of a ferroelectric polymer.

These tactile sensors are satisfactory for certain objectives, for example qualitatively sensing material hardness, surface texture or slippage. However, their high cost tends to discourage their use in all but a few specialized cases. Consequently, they are unable, in practical terms, to enhance the safety in general automatic manufacturing processes through widespread use.

Therefore, it is an object of the present invention to provide a tactile sensor for robotic equipment that enhances safety for robotic equipment, workpieces, and especially for operators working near the equipment.

Another object of the present invention is to provide a tactile sensing structure sufficiently low in cost for application to a robotic arm or other movable member as a "skin" covering substantially the entire surface area of the arm or member.

SUMMARY OF THE INVENTION

To achieve these and other objects, there is provided a tactile sensing skin for a movable member. The skin includes a first flexible dielectric film, forming a first insulative layer mounting with respect to the outside surface of a movable member, with a first surface facing outwardly away from the member. A second flexible and dielectric film forms a second insulative layer adjacent the first insulative layer, and has a second surface facing the first surface. A carbon based electrically conductive compound is applied, substantially uniformly, to one of the first and second surfaces. An electrically conductive metallic compound is applied to the other of the surfaces, so that the metallic compound and carbon compound are contiguous over the interface between the first and second insulative layers. The metallic compound is selectively applied to form a plurality of discrete pairs of first and second electrically conductive regions, and a dielectric gap between the conductive regions. A means is provided for establishing a substantially constant potential difference between the first conductive region and the second conductive region in each pair. A first matting of resilient fiber forms a first flexible layer attached to the outwardly facing surface of the second insulative layer, and an elastically deformable outer layer is attached to the outwardly facing surface of the first flexible layer. A control means, responsive to changes in the amount of electrical current flowing between the first and second electrically conductive regions in each pair, controls the travel of the movable member.

The means for establishing the substantially constant potential difference can include a first conductive path in electrical communication with each of the first conductive regions, a second conductive path in electrical communication with each of the second conductive regions, and means for setting a positive voltage level in the first conductive path.

The flexible dielectric films preferably are polyester, and the preferred metallic compound is silver oxide. A second matting can be provided between the member and first insulative layer.

The carbon base compound facing the silver oxide bridges the dielectric gap between each first and second electrically conductive region. Due to the reaction between the silver oxide and carbon, the conductivity between these regions increases, substantially linearly, with the amount of pressure applied to the second and third layers. Given the constant potential difference across the conductive regions, amperage necessarily increases with pressure.

The covering or skin can substantially surround a movable member, for example a robotic arm. Contact between the moving arm and an object elastically deforms the outer layer near the area of contact, and locally increases the pressure between the second and third layers, thus to increase current flow through any proximate pair of conductive regions. The control means, responsive to the increased amperage, can decelerate, stop or retract the arm.

An important feature of the present invention resides in the fact that current through the discrete pairs of conductive regions is substantially linearly responsive to increases in temperature as well as increases in pressure. Thus, the control means is able to stop or retract a robotic arm before the arm, or a workpiece held in the arm, is subjected to intense heat. On a more sensitive scale, a controller can "distinguish" between an object of ambient temperature and a warmer object, for example a human hand. Thus, the cover can prevent robot arms from injuring the operator, or can enable an operator to stop an errant robotic arm simply by contacting it with his or her arm or hand.

The covering requires a minimal number of discrete layers. Also, only one of the interfacing electrically conductive surfaces, i.e. the silver oxide surface, need be formed into discrete conductive regions. This reduces the cost of the covering, thus broadening the range of applications where the covering can be economically applied.

IN THE DRAWINGS

These and other features and advantages of the invention will become apparent upon a reading of the following detailed description and upon reference to the drawings, in which.

DETAILED DESCRIPTION OF THE PREFERRED EMBODIMENT

Figure 1:
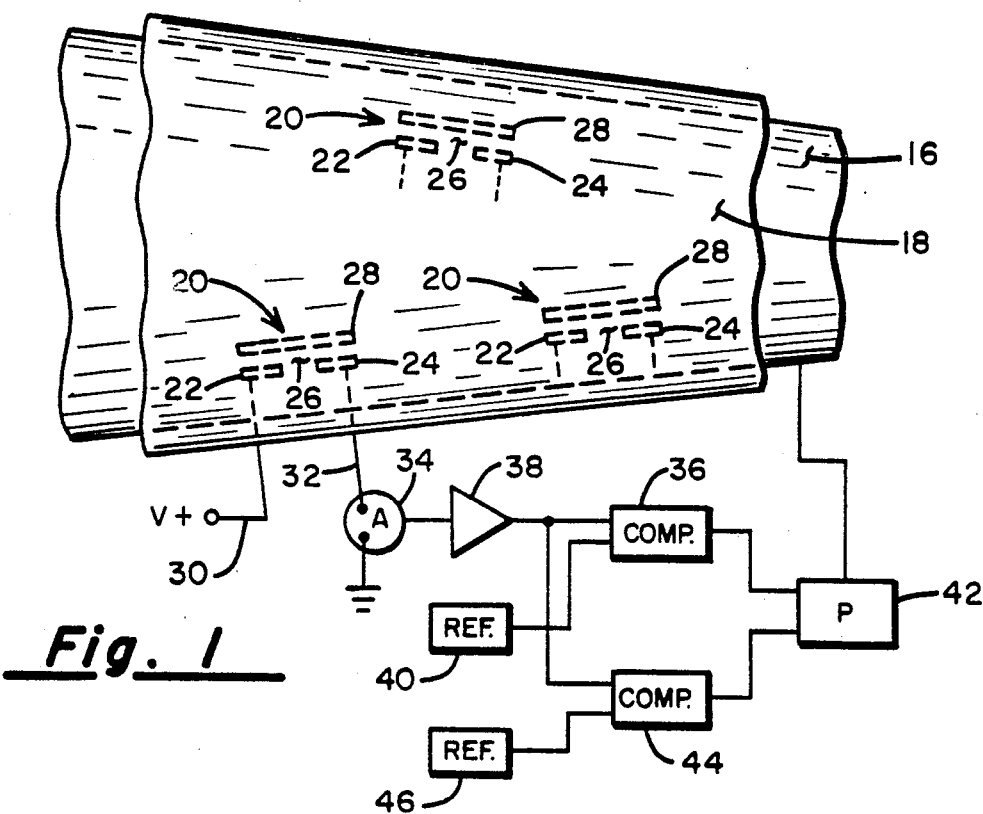
FIG. 1 is a schematic view showing a portion of a robotic arm surrounded by a tactile sensing skin constructed in accordance with the present invention.

Turning now to the drawings, there is shown in FIG. 1 a portion of a robotic arm 16 surrounded by a tactile sensing skin or covering 18. Formed in covering 18 are a plurality of discrete pairs 20 of electrically conductive regions, embedded in the covering and thus shown in broken lines. Each pair 20 includes a first conductive region 22, a second conductive region 24 and a dielectric gap 26 between regions 22 and 24. A conductive area 28 is positioned in face-to-face relation to the first and second conductive regions. If desired, numerous additional pairs of conductive regions can be provided at selective locations throughout covering 18.

A source of positive voltage V+ is applied to a first wire 30 that provides an electrically conductive path to conductive region 22. A second wire 32 provides a conductive path from conductive region 24 to ground, along which is provided an amp meter 34. The output of amp meter 34 is a signal which varies according to the amount of current flowing through it, and is provided as an input to a first comparator 36 through a signal amplifier 38. A signal from a first reference source 40 is provided as an additional input to the comparator. A difference signal, based on the comparison of the amplified signal with the reference signal, is provided to a power supply 42, which in turn controls movement of robotic arm 16. While only one control circuit is shown, it can be appreciated that one such circuit is provided for each pair 20.

To increase arm control options, output from amplifier 38 also can be supplied to a second comparator 44, where it is compared to the input from a second reference source 46. This arrangement permits a two-stage response to increased current between first and second conductive regions 22 and 24. For example, at a first, lower sensed current level, power from power supply 42 can be reduced to decrease the velocity of arm 16. Should the current continue to rise and surpass a second level as indicated by a signal amplitude greater than that from second reference source 46, power from power supply 42 can be terminated to stop the arm.

In operation, the signal from reference source 40 can be set such that should the amplified signal from amp meter 34 exceed a selected value, the comparator output will interrupt the power supply to terminate arm movement, or alternatively cause the power supply to decelerate or reverse the direction of arm movement.

Figure 2:
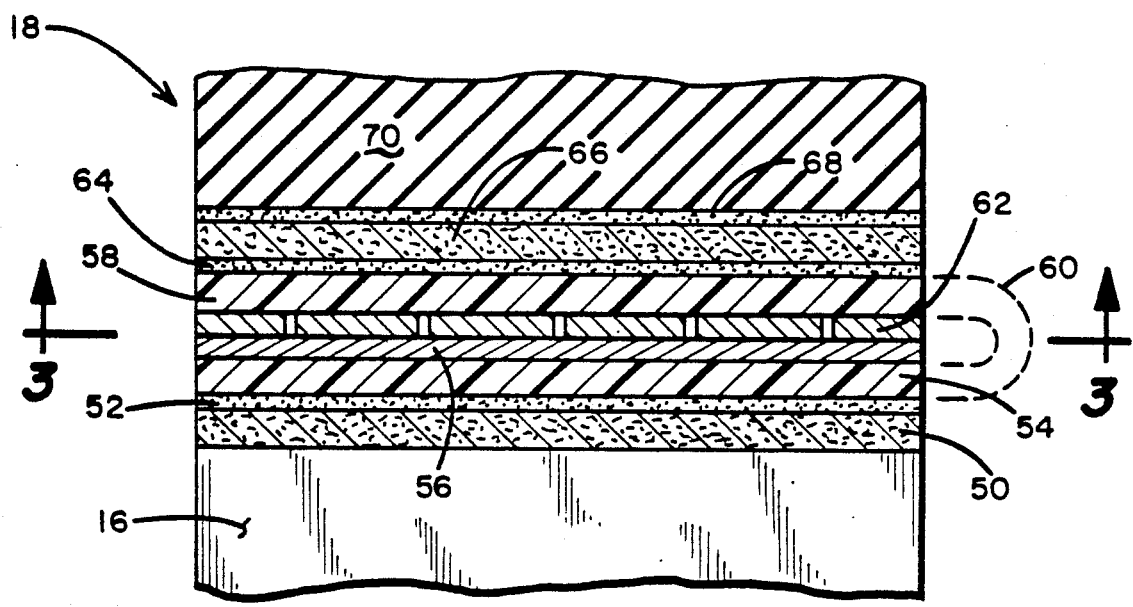
FIG. 2 is a sectional view of the tactile sensing skin.

FIG. 2 illustrates the various strata that comprise tactile sensing skin 18. Adjacent to robotic arm 16 is a first matting 50 formed of a flexible fiber, for example Kevlar brand fiber. Covering 18 ordinarily is not permanently bonded to arm 16, but slipped over the arm for frictional engagement therewith, much like a sleeve. Epoxy can be used to permanently attach the cover, if desired. On the outside surface of matting 50 is a bonded layer of epoxy adhesive 52, by which a first flexible electrially insulative film 54 is mounted to matting 50. Film 54 can be of a flexible polyester such as that sold under the trademark Mylar.

In many applications, matting 50 is not required, in which case film 54 is mounted directly to arm 16. However, where lateral (horizontal as viewed in FIG. 2) strain between adjacent strata is anticipated, matting 50 is well suited for absorbing such strain. Formed on the upwardly facing surface of film 54 is a first conductive layer 56, comprised of a carbon based compound including carbon particles in a resin binder.

Just outwardly of first film 54 is a second flexible and electrically insulative film 58, also preferably a polyester film. As indicated by the broken lines at 60, insulative films 54 and 58 can be formed from a single sheet of polyester film that is folded along one edge. A metallic compound, preferably silver oxide ($Ag_2O$) in a binder, is applied to the inwardly facing surface of second film 58 to form a second conductive layer 62, creating an interface between films 54 and 58 over which the carbon and silver oxide layers are contiguous. The application can be accomplished using silk screen printing, etching, or other appropriate means. While silver oxide is preferred, gold or copper compounds also may be used.

A bonding layer 64 of epoxy adhesive attaches a second matting 66 to the outwardly facing surface of second insulative film 58. Like matting 50, second matting 66 preferably is formed from Kevlar fiber.

On the outside surface of second matting 66 is a bonding layer 68 of epoxy adhesive, which binds an elastically deformable outer layer 70 to the second matting. Outer layer 70 is preferably a textured material, for example rubber, urethane or textured neoprene, and can have a roughened outside surface as shown to enhance the gripping of objects. Second matting 66 absorbs laterally acting forces between outer layer 70 and second film 58, and further protects second film 58 from excessive force concentrations.

Figure 3:
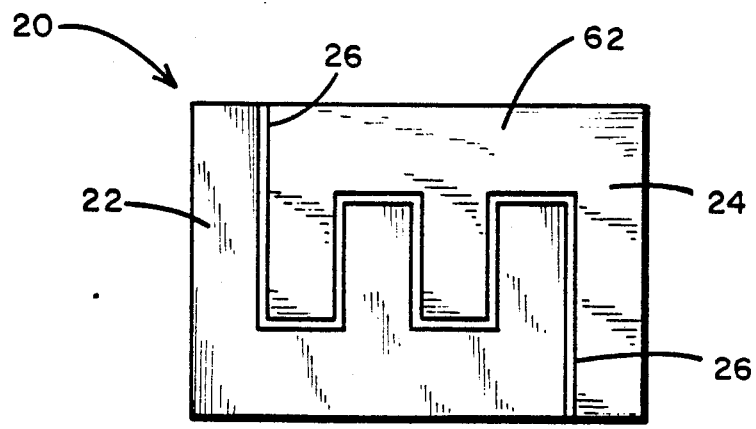
FIG. 3 is a sectional view taken along the line 3—3 in FIG. 2.

One of discrete pairs 20 is shown in FIG. 3 to illustrate the selective manner in which silver oxide is applied to the inwardly facing surface of second insulative film 58. The pair includes its associated first conductive region 22, second conductive region 24, and dielectric gap 26 separating the conductive regions from one another. Silk screen printing, etching, or other suitable processes are used to apply the silver oxide. The carbon base layer 56 faces the silver oxide, and is not applied to form patterns of conductive regions, but is substantially uniform over the entire outwardly facing surface of first film 54. Consequently, with carbon base and silver oxide layers 56 and 62 in contact with one another, portions of carbon based layer 56 bridge the gap between adjacent first and second conductive regions, permitting travel of electric current between the regions. Preferably, gap 26 forms an irregular, zig-zag path to maximize its length relative to the size of regions 22 and 24, to enhance conduction.

Figure 4:
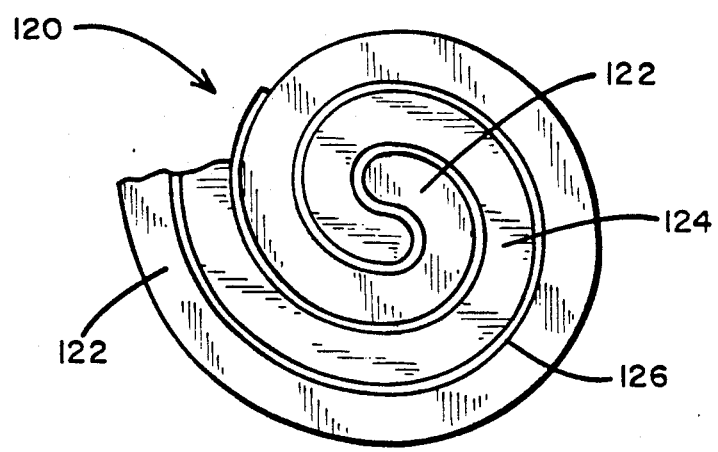
FIG. 4 shows an alternative arrangement of conductive regions in the skin.

FIG. 4 shows an alternative pair 120, including a third electrically conductive region 122 and a fourth electrically conductive region 124, separated from one another by an insulative gap 126. The conductive regions and gap run parallel to one another, generally in a spiral pattern. A particular advantage of this constuction lies in the ample length of gap 126 in relation to the surface area of the conductive regions. Also, in view of the relatively narrow, arcuate sectors, alternative pair 120, as compared to pair 20, is more sensitive to highly localized, pin-point pressure. It is to be appreciated that the following operational description, given in connection with first and second conductive regions 22 and 24, could as well apply to third and fourth conductive regions 122 and 124.

The electrical conductivity between the regions is influenced by chemical interaction between the carbon and silver oxide, and consequently is enhanced by an increase in temperature to the conductive region pair 20. The current flow is sensitive, as well, to pressure applied to second film 58 through outer layer 70, which tends to urge film 58 against first film 54. Amperage tends to increase due to the pressure increase, and also because the compression of films 54 and 58 and outer layer 70, which tends to generate heat within these layers.

Robotic arm 16, when employed in a particular automatic manufacturing process, has a well defined work envelope, for example an arcuate sector swept by the arm as it picks workpieces at one location and deposits them at another. Any object entering this work envelope eventually is encountered by the robotic arm. Such encounter may be as trivial as the brushing away of a stray workpiece, or as serious as pinching or other bodily injury to an operator. With arm 16 encased in tactile sensing skin 18, serious injury can be avoided as a moving arm 16 can be stopped almost instantaneously upon encountering an object.

An encounter with robot arm 16 is preceded by an object's movement, relative to the robot arm, toward the arm as indicated by the arrow in FIG. 2. Shortly after contact, an elastic depression is formed in outer layer 70 as indicated by broken lines at 71, and in accordance with the size and shape of the object. The depression does not absorb all of the force of contact between the object and arm, the remainder being transmitted through outer layer 70 to second film 58, pressing it against first film 54. For each pair 20 of conductive regions in the area of enhanced pressure, the conductivity between first and second regions 22 and 24 is increased. In view of the constant potential maintained between the conductive regions, an increased current flow results.

Continued arm movement toward the object increases the pressure between films 54 and 58, and thus increases the amperage. Eventually the amperage surpasses a predetermined amount, and arm 16 is decelerated, stopped or retracted in accordance with a preselected signal to power supply 42.

An object at a temperature greater than ambient also transmits heat to arm 16 through covering 18, in accordance with the heat conductivity and thickness of strata within covering 18, and the temperature difference between arm 16 and the object. Such heat transfer inreases the temperature at the interface between films 54 and 58. In cooperation with the enhanced pressure, this tends to accelerate the amperage increase. Consequently, robotic arm 16 encased in covering 18 can "distinguish" between an object at ambient temperature, and an object radiating heat.

The power necessary to maintain each of the first conductive regions at a positive voltage is quite low, as current in the 1–1,000 micro amperage range provides a satisfactory signal to comparators 36 and 44, particularly when enhanced by amplifier 38. Positive voltages for V+ are selected from the range of 0.05 to 15 volts. Also, since the temperature and pressure response is substantially linear, particularly in the range of plus or minus five percent of the selected current level, the sensitivity of arm 16 to pressure and temperature may be increased, or decreased, by changing the output of reference sources 40 and 46.

Covering 18 can be installed as a skin, covering substantially the entire exterior surface of arm 16 or another movable member. Hence, it can protect the robot arm from dust or other foreign matter, as well as warning the arm of impending collisions with unexpected objects in the robot work envelope, and affording the operator an opportunity to stop the robot arm simply by stricking or otherwise contacting a portion of the covering at or near a pair of conductive regions.

What is claimed is:

1. A tactile sensing skin for a movable member including:
   a first flexible dielectric film forming a first insulative layer mounted with respect to the outside surface of a movable member, and having a first surface facing outwardly away from said member;
   a second flexible and dielectric film forming a second insulative layer adjacent said first insulative layer, and having a second surface facing said first surface;
   a carbon base electrically conductive compound substantially uniformly applied to one of said first and second surfaces;
   an electrically conductive metallic compound selectively applied to the other of said surfaces, whereby said metallic compound and carbon base conductive compounds are contiguous over the interface between said first and second films, said metallic compound being selectively applied to form a plurality of discrete pairs of first and second electrically conductive regions and a dielectric gap between said conductive regions of each pair;
   a means for establishing a substantially constant potential difference between the first conductive region and second conductive region in each pair;
   a first matting of resilient fiber forming a first flexible layer attached to the outwardly facing surface of said second film;
   an elastically deformable outer layer attached to the outwardly facing surface of said first flexible layer; and
   a control means responsive to changes in the amount of electrical current flowing between said first and second electrically conductive regions, for controlling travel of said member.

2. The tactile sensing skin of claim 1 further including:
   a second matting of a resilient fiber forming a second flexible layer adjacent said outside surface of said movable member, said first film being attached to the outwardly facing surface of said second matting.

3. The tactile sensing skin of claim 2 wherein:
   said means for establishing a substantially constant potential includes a first conductive path in electrical communication with each of said first electrically conductive regions, and a second conductive path in electrical communication with each of said second electrically conductive regions, and means for providing a positive voltage level in said first conductive path.

4. The tactile sensing skin of claim 2 wherein:
   said first and second flexible dielectric films comprise a single sheet of polyester film.

5. The tactile sensing skin of claim 1 wherein:
said conductive metallic compound comprises silver oxide.
6. The tactile sensing skin of claim 1 wherein:
each said gap is formed in an irregular path to increase its length relative to the size of said regions.
7. The tacile sensing skin of claim 1 wherein:
each said first conductive region, second conductive region and said gap are arranged in a spiral pattern.
8. The tactile sensing skin of claim 1 wherein:
said dielectric films, first matting and outer layer overlie substantially all of said member in surrounding relation thereto.

* * * * *